May 3, 1927.
C. H. H. RODANET
1,626,697
CONSTRUCTION OF SPEED INDICATORS
Filed July 18, 1924
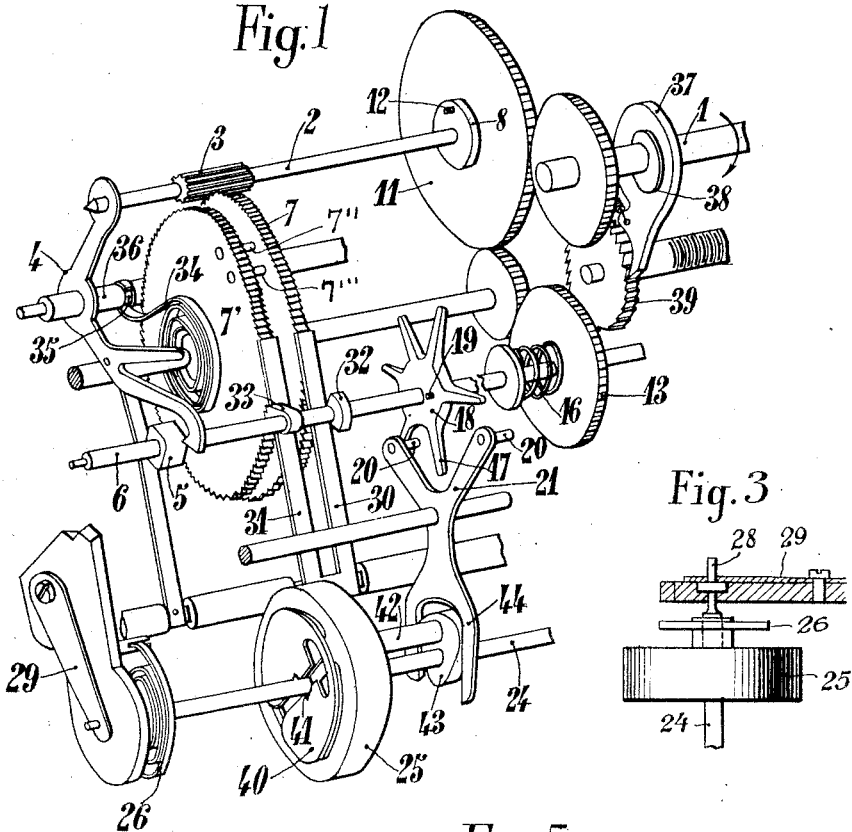
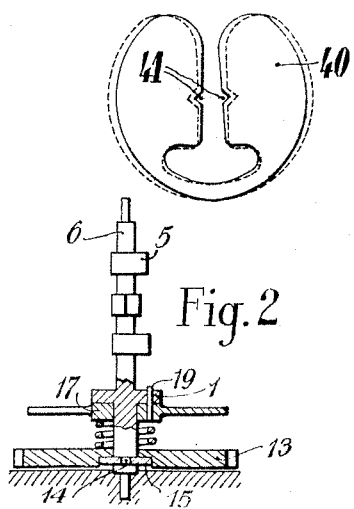
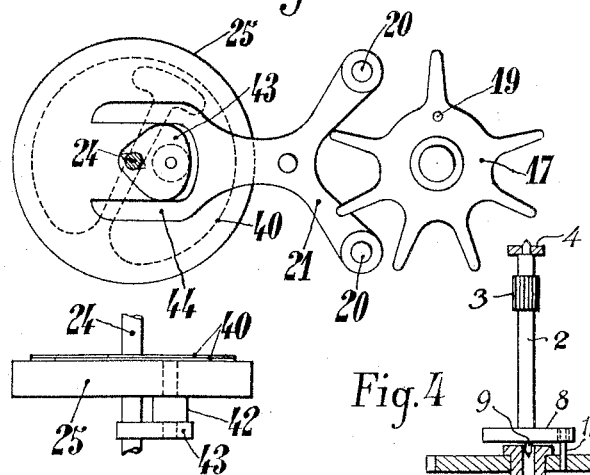
Inventor
C. H. H. Rodanet
by Marks & Clerk Patented May 3. 1927.

1,626,697

UNITED STATES PATENT OFFICE.

CHARLES HILAIRE HENRI RODANET, OF PARIS, FRANCE, ASSIGNOR TO SOCIÉTÉ ANONYME: ETABLISSEMENTS ED. JAEGER, OF PARIS, FRANCE.

CONSTRUCTION OF SPEED INDICATORS.

Application filed July 18, 1924, Serial No. 726,892, and in France August 11, 1923.

Speed indicators for vehicles or the like are known in which a clock-work allows a toothed wheel actuated by the shaft or the axis the speed of which is to be determined to be coupled, for a predetermined period of time, with a toothed wheel acting on the hand, or index of the indicator. This latter wheel, after reaching its extreme position, comes back, upon unclutching, to its initial position, the index of the indicator being immobilized by means of a pawl and ratchet device, until the above mentioned functions take place over again for a new cycle. In the apparatus of this type, the toothed wheel coming in engagement with that of the indicator, is mounted on a pivoting lever which is subjected to the action of one of the three cams carried by an axis actuated by the clock-work. This cam determines therefore the throwing in or out of gear of the two toothed wheels, whilst the two other cams act on pawls engaging with the teeth of the co-axial wheels.

Besides, in these apparatus, a device is provided which determines the automatic winding up of the clock-work.

The present invention has for its object, improvements in the construction of speed indicators of the above mentioned type, these improvements concerning more particularly the means which permit to regulate the speed of the clockwork and cam shaft as well as the regularity of the displacements of the members acting on the teeth of the two co-axial wheels.

In the accompanying drawing and by way of example, Fig. 1 illustrates, in perspective view, the whole of the gearing of an indicator made according to the features of the present invention; the parts constituting the gearing have been subjected to certain relative displacements in order to render the drawing clearer.

Figs. 2, 3 and 4 are respectively vertical sections through the axis of the cam shaft, the axis of the shaft for the spiral spring, and the axis of balance wheel shaft receiving the movement of the shaft the speed of which is to be measured.

Fig. 5 shows the mechanism for allowing the balance wheel to act on the escapement, and Fig. 6 is a view of a metal washer which can be fitted on the balance wheel for modifying the beating period of the same.

As indicated in the foregoing, the gearing of the speed indicator is constituted in the usual manner, by a transmission gear connecting the shaft 1, the speed of which is to be measured, with the axis 2 carrying the pinion 3. This axis 2 is, on the other hand, connected to the rocking lever 4 for throwing in and out of gear on which acts one of the cams 5 of the shaft 6.

For permitting the oscillations of the pinion-carrying axis 2, so as to throw its pinion 3 in or out of gear with one of the co-axial wheels 7 of the indicator, the said axis 2 carries a coupling plate 8 and is terminated by a pivot 9 capable of rocking in a fixed step-bearing 10 forming a guide for the pinion of the transmitting gearing 11. A pin 12 causes the pinion 11 to rotate with the coupling plate 8 (Fig. 4).

The wheel 7 is provided with a laterally extending pin 7" while the wheel 7' is provided with a pin 7''' and these pins 7" and 7''' constitute abutments which permit of the entrainment of the wheel 7' by the wheel 7 when the pinion 3 engages the lateral wheel with the wheel 7. The arm 4 determines the engagement and disengagement of the pinion 3 with the wheel 7 and not with the wheel 7'.

In place of a spring barrel, a second transmitting gearing is provided for acting on the toothed wheel 13 carried by the cam shaft 6. This pinion 13 drives the said shaft 6 through the medium of a friction coupling.

For that purpose, the pinion 13 is loosely mounted on the shaft 6 which has a reduced portion 14 in which can fit a semi-circular key 15 preventing any displacement of the said pinion 13 along the shaft 6. A spring 16 bears on the one hand between the upper face of this pinion 13 and on the other hand between the lower face of the pin wheel 17, of an escapement. This wheel 17 (Figs. 1–2) is integral with the cam shaft 6. In the case illustrated, it is made of fibre and it is coupled to the plate 18, integral with the cam shaft 6, by a pin 19.

This escapement wheel 17 carries six equidistant arms projecting in a radial direction and in a fan like manner from a portion of the periphery of the wheel and another single arm opposite a point medially of the first mentioned arms. These arms coact with the rollers 20 which in turn project from the arms of a rocking fork 21, the latter acting as an anchor and also terminating at its opposite end in another fork 44 for a purpose which will presently appear. A shaft 24 is now provided and carries a balance wheel 25 subject to the action of a spring 26.

It will also be noted that, according to the features of the present invention, that instead of providing the two usual pawls which act on the teeth of the co-axial wheels 7 and 7' flat springs 30, 31 are employed.

These springs are secured at one of their ends (Fig. 1) and are subjected to the action of the respective cams 32—33. Besides the constructional simplification which results from the fact that the surface of the spring with which engages the cam is a plane, these arrangements have the following advantage: notwithstanding the wear of the engaging edges, the springs 30—31 can always correctly engage with the teeth 7—7'. On the contrary, in the case of pawls, the wear of the engaging noses can be such that the pawls escape from the teeth and, rubbing on the latter, determine their rapid wear.

In the example illustrated, the returning spiral springs 34 of the co-axial wheels 7—7' are simply hooked, through their rolled ends, over reduced bearings 35 of one of the pillars 36 connecting the plates of the gearing.

For diminishing noise, pawl 37 which is actuated by the eccentric disc 38 rigidly secured on the shaft 1 the speed of which is to be measured, has also been made of fibre.

The adjustment of the beating period of the escapement is effected by modifying the weight and, consequently, the inertia of the balance wheel 25. For that purpose, it is possible, by way of example, to attach to the said balance wheel 25, additional weights permitting to obtain an exact adjustment. These parts can be of metallic washers 40 balanced relatively to their centre. These split washers constitute, moreover, real spring clips the branches of which can be resiliently spaced apart, so as to grip the shaft 24 of the wheel 25 in the central notches 41.

The balance wheel 25 is, on the other hand, connected by a spacing wedge 42 to a triangular cam 43, the two apices of which are rounded off and which is mounted on the shaft 24 of the balance wheel 25. This rocking cam 43 fits between the branches of the fork 44, which depend from the anchor 21 subjected to the action of the pin wheel 17.

What I claim as my invention and desire to secure by Letters Patent is:—

In a speed periodical indicator having a toothed wheel which is periodically driven by the shaft the speed of which is being measured and a co-axial toothed wheel actuated by clockwork, spring blades secured, at one of their ends, on the support of the indicator and directly engaging, through their other ends, with the respective teeth of the co-axial wheels, these spring blades being directly engaged by cams of the shaft connected to the clockwork.

In testimony whereof I have signed my name to this specification.

CHARLES HILAIRE HENRI RODANET.